3,466,688
VEHICLE-WASHING INSTALLATION
Heinrich Führing, Augsburg, and Richard Fleschhut, Goggingen, Germany, assignors to Bowe, Bohler & Weber KG.
Filed Dec. 15, 1966, Ser. No. 602,064
Claims priority, application Germany, Dec. 31, 1965, B 85,223
Int. Cl. B60s 3/06
U.S. Cl. 15—21    7 Claims

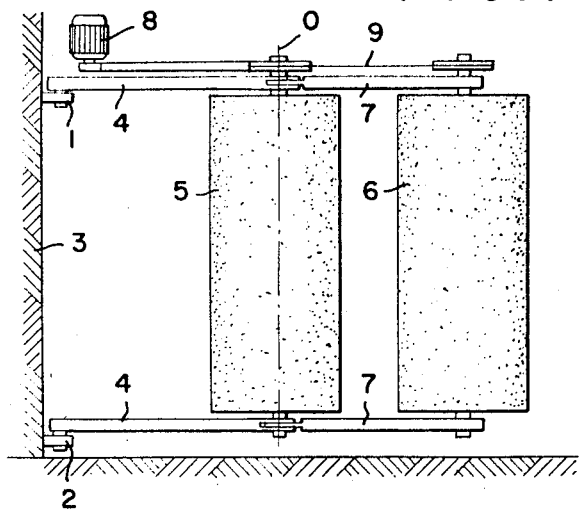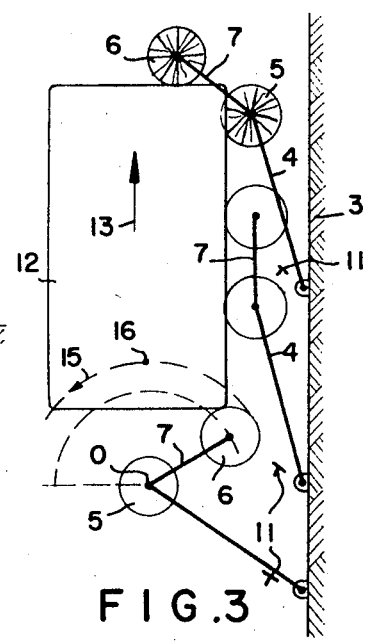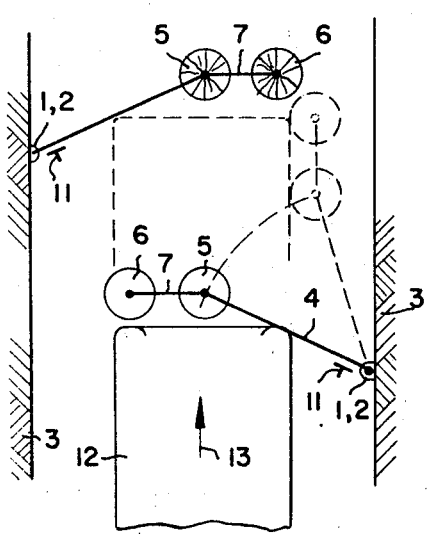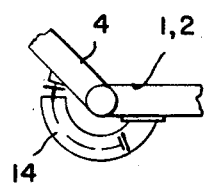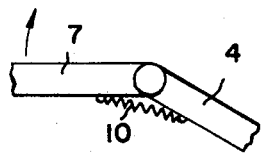

ABSTRACT OF THE DISCLOSURE

In a car-washing installation, two parallel rotary brushes are supported on a lever arm which is articulated to a longer supporting arm for relative swinging about a pivotal axis parallel to the brush axes, the two arms being normally biased into a position in which the pivotal axis substantially coincides with the centerline of an oncoming vehicle while the two brushes lies in a plane perpendicular to this centerline.

---

Our present invention relates to a vehicle-washing installation with pairs of rotary brushes which are applied to the surface of a vehicle during its pasage through a scrubbing station.

In such installations, which may be fixed or movable, several brushes are secured to a gantry-like framework at the side of and/or above the vehicle on pivotal supports mounted on the wall and the ceiling of the washing compartment. To wash the vehicle, the brushes are moved towards its surface so as to be applied thereagainst under the action of springs or their own weight during their rotation.

In a known vehicle-washing installation (German Patent No. 524,489) a brush roller mounted on a pivotal frame is displaceable parallel to the frame axis whilst varying its distance therefrom. This is to prevent the frame from being subjected to bending stress when the relative movement between the installation and the vehicle reverses.

With such a pivotal frame or arm, if long enough, it is possible to extend the washing brush across the front area of the vehicle to make it bear with adequate pressure against said front, the pivotal frame being laterally deflected as the vehicle moves forward. The rear of the vehicle, however, cannot be cleaned with the same brush unless the vehicle traverses the installation in reverse in the opposite direction. This also applies if the brush is secured to any other support by means of which it is adapted to be reciprocated at right angles to the vehicle path, since it is not brought up with the required pressure against the rear surface of a vehicle which passes through the installation in a forward direction only.

It is therefore an object of the invention to produce a simple arrangement in which the brushes are automatically applied to the front and sides of a vehicle moving through the washing installation, and also sweep over at least a portion of the rear surface of the vehicle without any need for reversing the direction of movement of the vehicle or the instllation, or for providing positive means for controlling the brush motion.

In a vehicle-scrubbing system according to our invention, one of the ends of a rotating brush is mounted on one of the ends of a lever arm, which in turn is pivotally mounted on a support for swinging about a axis parallel to the axes of brush rotation and mounted for displacement toward and away from the path of relative movement of the vehicle and the supporting framework.

The support which reciprocates the lever arm carrying the brushes may have a variety of forms, e.g. it may be designed as a reciprocatable arm on a cross-beam or as a parallel-motion guide assembly. It may be outwardly displaced along the side of the vehicle and returned to the center by hand, or even by the vehicle itself with the aid of feelers, of a light beam or, in a simplified embodiment of the invention, of brush pressure.

When the support is in the proximity of the vehicular rear surface, the lever arm pivotally mounted thereon is readily caused to assume such a position that it sweeps over at least a portion of the rear surface of the vehicle with one brush.

In accordance with a particular feature of the invention the lever arm is swingably mounted at one end on an elongate supporting member. Thus, the arm forms an articulated extension of the supporting member and, when the latter is displaced towards the rear of the vehicle, is held so that a brush mounted on its free end contacts the rear surface of the vehicle.

In accordance with another feature the lever arm is adapted to be held in such a normal position by means of a restoring force, e.g. by a spring or by its dead weight, that with the support also in a normal position the brushes are opposite the front surface of the vehicle. The oncoming vehicle thus pushes the brushes aside until they bear upon its sides. When the vehicle has nearly passed, the brushes sweep over a portion of the rear surface of the vehicle. In order to clean at least half the rear surface of the vehicle, the support carrying the lever arm is displaceable by a restoring force toward the vehicle path so that the pivotal axis of the lever arm assumes a normal position substantially in the region of the center of the vehicle outline, the lever arm then tracing an arc centered on this axis so that its free end, and the brush carried thereon, follows the advancing vehicle in a forward and inward sweep toward the centerline of the vehicle. Thus, with suitable dimensioning of the lever arm, the brushes not only are automatically applied to the front and sides of the vehicle but also sweep across at least half the rear surface thereof.

The other half of the vehicular rear surface may be washed by a brush assembly arranged on the other side of the vehicle within the scrubbing station. To prevent the swingable supporting member from returning too fast into its original position and also to ensure washing of the last portion of the side surface, a damping member may be provided to retard the return swing of that member.

These and further features of the invention are shown in the accompanying drawing in which:

FIG. 1 is a side view of a brush assembly in accordance with the invention;

FIG. 2 is a plan view of two brush assemblies in a washing station in their original position before washing commences;

FIG. 3 shows three positions of a single brush assembly in accordance with the invention during passage of a vehicle;

FIG. 4 is a detail view of a damping device for a pivotal brush support shown in its normal position;

FIG. 5 shows a spring for effecting the return movement of the pivotal brush support.

Figure 6:
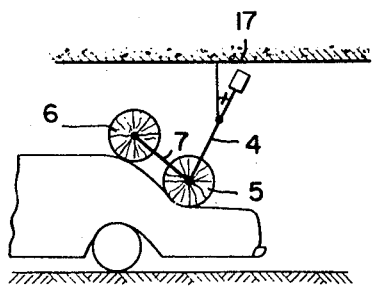
FIGS. 6–9 show alternative embodiments of a brush arrangement in accordance with the invention.

As evident from FIG. 1, a pair of pivotal arms 4 is secured in bearings 1 and 2 on the wall of a washing shed or a mobile framework 3. Two rotary brushes 5 and 6 are journaled at each of their upper and lower ends on the ends of a respective lever arm 7. One end of each lever arm 7 which coincides with the axis of the brush 5 is in turn pivotally mounted on one of the pivotal arms 4. The brushes are driven by a motor 8 by means of transmission belts 9.

In a preferred embodiment of the invention, as shown in FIG. 2, an individual washing installations are provided on opposite side walls 3 of a scrubbing station. Each installation comprises lever arms 7 and pivotal arms 4 besides the brushes 5 and 6. The arms are so mounted that, when no forces act thereon, they return into the normal position in which the arms D rest against step 11 as shown in FIG. 2. This may be achieved by tilting their pivotal axes through a small angle $\alpha$ relative to the vertical, as is shown in FIG. 1. The arms 4 or 7 may also be returned to their required starting position defined by suitable stops, by resilient means such as a spring 10 as illustrated in FIG. 5 for one of the arms 7. FIG. 3, a cycle of three different positions of an assembly comprising the arms 4 and 7 is shown. Normally it is only necessary to provide one such an assembly on each side of the washing station.

If a vehicle 12 is displaced in the direction of the arrow toward the brushes 5 and 6, the pressure acting upon them swings the pivotal arms 4 laterally outwardly, the arm 7 with the brushes 5 and 6 being pulled away across the front surface of the vehicle. When the brush 5 at the junction of arms 4, 7 passes the edge of the front surface, a position of the lever arm 7 and the pivotal arm 4 shown at the top in FIG. 3 is reached. When the vehicle 12 is further advanced in the direction of the arrow 13, both brushes 5 and 6 bear upon the side of the vehicle, as evident from the central position of the brushes shown in FIG. 3 and the dotted-line position of the right-hand assembly in FIG. 2. When the brush assembly has traveled the full length of the side surface of the vehicle, then the pivotal arm 4 returns to its original position. The lever arm 7 is of such a length that the outer brush 6 is still engaged either by the vehicle side or by the outer edge of the back of the vehicle, as illustrated at the bottom in FIG. 2.

To prevent the arm 4 from returning too speedily into its inoperative position, its movement, as indicated in FIG. 4, is slowed down by a damping device 14 in the manner of a hydraulic door closer.

If the vehicle 12 continues to proceed in the direction 13, then a pivotal movement of the lever arm 7 occurs about the axis O of the brush 5, the course of which corresponds substantially to the arc 15 shown in broken lines in FIG. 3. The rotating brush 6 therefore, during the advance of the vehicle, is urged against the rear surface and washes it until reaching point 16 at the intersection of the vehicle centerline with the arc 15. The other half of the vehicular rear surface is washed by the corresponding brush assembly on the other side of the vehicle or the washing station.

The pivotal arm 4 may also have a normal position at right angles to the direction 13. In this case the lever arm 7 should be somewhat longer to cause the rear surface of the vehicle to be completely swept over.

Figure 9:
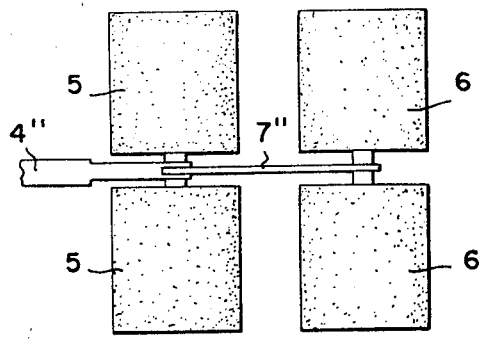
Figure 8:
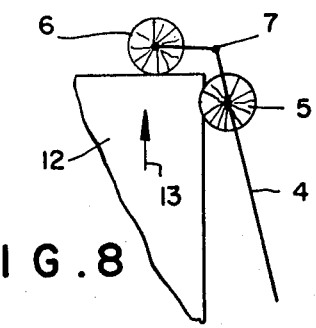

The inclination of the pivotal arm 4 at an acute angle with reference to the direction of motion 13, permits a reduction of the overall width of the installation. If the lever arms 7 are straight, they must be disposed at levels above and below the bodywork of the vehicle, which in many cases is not always possible because of lack of space. However, some space saving can be effected by bending the outer arm as shown at 7' in FIG. 8. With such a curved or bent arrangement of the lever arm it is also possible to manage with a single pivotal arm 4" and a single lever arm 7" per assembly (FIG. 9), the cylindrical brushes 5 and 6 being then mounted on the arms at their centers. The pivotal arm 4 may be arcuate or bent. It is also possible to omit the lower arms 4 and 7 in FIGURE 1 and mount the brushes only on the upper arms.

Figure 7:
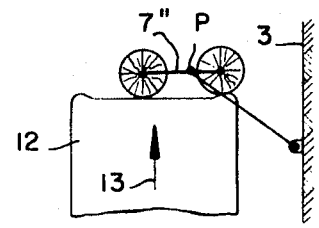

Other arrangements in accordance with the invention, in which the lever arm 7 supporting the two brushes is mounted on a pivotal arm 4, are also possible. Thus, FIG. 6 shows an example in which an assembly for washing a vehicle roof is secured to the ceiling 17 of the washing installation. The junction of the lever arm 7 with the pivotal arm 4 need not necessarily be at its end and need not coincide with a brush axis. The junction may be located in the region between the brushes, as evident from the example of FIG. 7 where the lever arm 7''' is pivoted at a point P between the brushes but closer to the axis of the inner brush. If the lever arm is curved or bent at an angle it is advisable for its mounting pivot to coincide with its main bending point. The invention is thus not limited to the embodiments shown.

We claim:

1. A vehicle-washing installation comprising a framework forming a path for a vehicle moving relatively to said framework; a support laterally mounted on said framework for movement toward and away from said path; and arm articulated to said support for relative swinging about a pivotal axis transverse to said path, said arm being biased relatively to said support for extending generally transversely across said path in a normal position of said support in which said pivotal axis lies substantially at the center of said path; biasing means urging said support into said normal position; a pair of rotary brushes carried on said arm for rotation about respective axes parallel to said pivotal axis, one of said brushes being relatively close to and the other of said brushes being relatively remote from said pivotal axis; and drive means for rotating said brushes.

2. An installation as defined in claim 1 wherein said axes are vertical.

3. An installation as defined in claim 2 wherein said support is an elongate member pivotally connected with said framework for swinging in a horizontal plane, said arm forming an extension of said member including therewith an angle of at least 90° but less than 180°.

4. An installation as defined in claim 3 wherein said arm is substantially shorter than said member.

5. An installation as defined in claim 3 wherein said member is provided with stop means for arresting same in said normal position at an acute angle with reference to said path.

6. An installation as defined in claim 3 wherein said member is provided with damping means for retarding its return to said normal position by said biasing means upon deflection from said normal position by an oncoming vehicle.

7. An installation as defined in claim 1 wherein the axis of rotation of said one brush coincides with said pivotal axis, said arm having a free end carrying the other brush.

References Cited

UNITED STATES PATENTS 2,242,692   5/1941   Yingling _____ 15—53
3,090,981   5/1963   Vani et al.

FOREIGN PATENTS 1,154,728   9/1963   Germany.
892,598    3/1962   Great Britain.
6,405,945   11/1964   Netherlands.

EDWARD L. ROBERTS, Primary Examiner

U.S. Cl. X.R.

15—53